ial Light Beams," J. Applied Physics 39 (1968), pp. 3597-3639.

Ippen et al., "Astigmatically Compensated Cavities for CW Dye Lasers", IEEE J. Quantum Electron, vol. QE-8, No. 3, pp. 373-379.

Primary Examiner—William L. Sikes
Assistant Examiner—Georgia Y. Epps
Attorney, Agent, or Firm—Flehr, Hohbach, Test, Albritton & Herbert

United States Patent [19]
Basu et al.

[11] Patent Number: 4,951,294
[45] Date of Patent: Aug. 21, 1990

[54] DIODE PUMPED MODELOCKED SOLID STATE LASER

[75] Inventors: Santanu Basu, Palo Alto; Robert L. Byer, Stanford, both of Calif.

[73] Assignee: The Board of Trustees of Leland Stanford, Jr. University, Stanford, Calif.

[21] Appl. No.: 185,085

[22] Filed: Apr. 22, 1988

[51] Int. Cl.$^5$ .............................................. H01S 3/091
[52] U.S. Cl. ....................................... 372/75; 372/21; 372/71; 372/93
[58] Field of Search ....................... 372/71, 75, 92–94, 372/101, 21

[56]  References Cited

U.S. PATENT DOCUMENTS

| | | | |
|---|---|---|---|
| 3,731,223 | 5/1973 | Johnston, Jr. | 372/93 |
| 3,754,195 | 8/1973 | Johnston, Jr. et al. | 372/93 |
| 3,975,693 | 8/1976 | Barry et al. | 372/93 |
| 3,983,406 | 9/1976 | Lax et al. | 307/425 |
| 4,340,969 | 7/1982 | Hamilton et al. | 372/93 |
| 4,656,635 | 4/1987 | Baer et al. | 372/21 |
| 4,791,631 | 12/1988 | Baumert et al. | 372/75 |

OTHER PUBLICATIONS

Boyd et al., "Parametric Interaction of Focused Gauss-

[57]  ABSTRACT

In a three-mirror optical resonator, solid state laser, the gain member is a thin slab, such as Nd:glass, disposed at Brewsters angle to minimize insertion loss. The gain slab is disposed at a beam waist in a confocal arm of the optical resonator. Optical pumping radiation from a laser diode source is focused through one of the concave mirrors of the confocal arm of the resonator into the gain slab. The second arm of the resonator is defined between a planar mirror and one of the confocal mirrors. An acousto-optic mode-locking modulator is disposed in the collimated beam region of the resonator proximate the planar mirror. Additional pumping diodes pump collinearly through the other confocal mirror for higher power operation. The slab is rotated and translated to average thermally induced stress and defocusing effects.

24 Claims, 1 Drawing Sheet

DIODE PUMPED MODELOCKED SOLID STATE LASER

GOVERNMENT CONTRACT

The present invention emanated from work which was at least partially supported by the U.S. government, and the government has certain rights therein.

BACKGROUND OF THE INVENTION

The present invention relates in general to diode pumped solid state lasers and, more particularly, to such a laser employing a three-mirror optical resonator.

DESCRIPTION OF THE PRIOR ART

Mode-locked solid state lasers are very useful sources of picosecond pulses at the laser wavelength. Heretofore, mode-locked Nd:glass lasers have been built with flash-lamps for pulsed operation. Cw arc lamps have been used with Nd:YAG and other crystalline media, which possess higher gain than Nd:glass. Lamp pumped systems are bulky, they suffer from pump fluctuations and heating problems and require water cooling and high-voltage power supplies.

Mode-locked lasers have also been built in the end pumped geometry with argon ion and die laser pumping. These lasers have the disadvantage of being bulky.

It is also known from the prior art to provide a three-mirror cavity for use in dye lasers. Such a laser is disclosed in an article appearing in IEEE Journal of Quantum Electronics, Vol. 8, No. 3, pgs. 373-379, published in 1972.

It is also known from the prior art to optically pump a solid state laser gain medium with optical pumping radiation emanating from a semiconductive diode or diode laser, such lasers are compact, efficient and do not require water cooling. These diode pumped lasers are also stable because of their compact design and have overall efficiency with reduced electrical input power.

It would be desirable to obtain a diode pumped mode-locked solid state laser capable of being scaled up to higher than average output power levels without sacrificing the performance and the efficiency of the laser.

SUMMARY OF THE PRESENT INVENTION

The principal object of the present invention is the provision of an improved diode pumped solid state laser.

In one feature of the present invention, a solid state member of laser gain material is disposed at a waist within a confocally focused portion of a three-mirror optical resonator and end pumped with pumping radiation emanating from a semiconductive diode disposed outside the optical resonator, whereby a highly efficient solid state laser is obtained which is capable of being mode-locked and of being scaled up to high average output power levels while maintaining high efficiency.

In another feature of the present invention, the lasant radiation within the three-mirror optical resonator is modulated for mode-locking the lasant radiation therein.

In another feature of the present invention, the solid state member of lasant gain material comprises a slab disposed at a waist within the confocal portion of the three-mirror optical resonator with the major faces of the slab disposed at Brewsters angle to the optical axis of the resonator, whereby the insertion loss of the laser gain medium is reduced.

In another feature of the present invention, a slab of laser gain material is moved within the confocal portion of the resonator for averaging heating effects within the slab, whereby the laser may be operated at high average output levels without encountering thermal and stress induced focusing effects.

In another feature of the present invention, the three-mirror optical resonator includes a generally planar mirror for reflecting resonant radiation back to one of the concave mirrors of the confocal portion of the resonator with a mode-locking modulator disposed in the arm of the resonator adjacent the planar mirror, whereby the mode-locker is placed in a collimated beam region of the resonator for maximum efficiency.

In another feature of the present invention, an optically non-linear harmonic generating member is placed within the confocal region of the three-mirror resonator at essentially a beam waist therein for efficient harmonic generation.

In another feature of the present invention, the solid state member of laser gain material is selected from the group consisting of Nd:glass, Nd:YAG and Nd doped $MgO:LiNbO_3$.

Other features and advantages of the present invention will become apparent upon a perusal of the following specification taken in connection with the accompanying drawings wherein:

DESCRIPTION OF THE PREFERRED EMBODIMENTS

Figure 1:
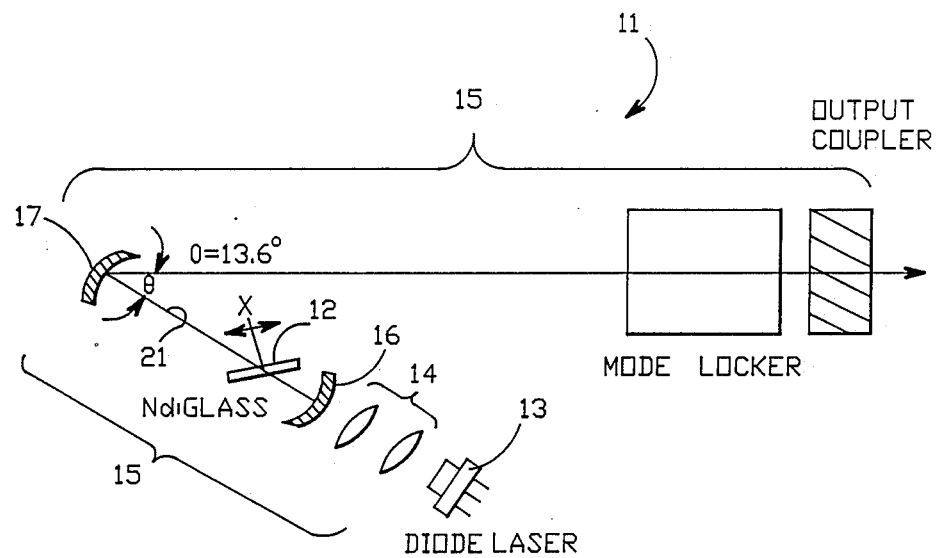
FIG. 1 is a longitudinal sectional view, partly schematic, of a three-mirror solid state laser incorporating features of the present invention.

Referring now to FIG. 1, there is shown a laser 11 incorporating features of the present invention. In the laser 11, a slab of lasant gain material 12 is optically pumped by means of a laser diode 13, the optical pumping radiation emanating from the diode 13 being collected and focused by a pair of lenses 14 onto the slab of lasant gain material 12 for optically pumping the laser gain material. The laser gain material 12 is disposed within one arm of a three-reflector optical resonator 15 formed by a pair of concave, confocal mirrors 16 and 17 and a planar mirror 18. The concave mirrors 16 and 17 form a confocally focused arm of the three-mirror resonator 15, whereas the second arm of the resonator is formed by curved mirror 17 and planar reflector or mirror 18. In the confocal arm of the resonator, the mirrors 16 and 17 are essentially spherical with radii of curvature selected to provide a beam waist at the position of the laser gain material 12. Input mirror 16 is coated to be anti-reflective to the optical pumping radiation emanating from the laser diode 13 as focused by the lenses 14 through the back of the input mirror 16 and into the laser gain medium 12.

The laser gain medium 12 (Nd:glass, Nd:YLF, or Nd:YAG) is preferably a slab having a pair of narrowly spaced, mutually opposed broad faces with the broad faces inclined to the optical axis 21 of the confocal arm of the resonator at Brewsters angle to avoid unwanted reflection of the optical radiation off the faces of the laser gain medium 12. The slab 12 is relatively thin, having a thickness on tho order of the absorption length of the optical pumping radiation for efficient optical pumping so as to reduce unwanted losses in the resonator 15. In a preferred embodiment, the slab 12 is a disc which is rotated about its axis of revolution, i.e., the X axis, and is also translatable in the plane normal to the X axis so as to average the power dissipation in the laser gain medium 12 to avoid undesired thermal stress and focusing effects. An optically non-linear harmonic generating medium preferably is disposed at the beam waist on the optical axis of the optical resonator between the concave mirrors 16 and 17 for generating harmonic radiation of the latent radiation. Most desirably, the optically pumped mode volume of the laser gain member itself is an optically non-linear material for such harmonic generation.

A mode-locker 22 is disposed in the second arm of the optical resonator 15 and preferably close to the output coupler or output mirror 18 so that the resonant beam within the mode-locker is essentially collimated for efficient mode-locking operation. In a typical example, the mode-locker 22 is an acoustooptic modulated at the mode-locking frequency. The output mirror 18 is partially transmissive at the resonant frequency of the optical resonator 15 to provide the output beam 23.

The three-mirror optical resonator is of the type described in the IEEE Journal of Quantum Electronics, Vol. 8, No. 3, pgs. 373–379 of 1972.

In a typical physical realization of the laser 11 of FIG. 1, the input mirror 16 is spherical having a radius of curvature R of approximately 2.5 cm, mirror 17 is spherical having a radius of curvature of approximately 12 cm and the output mirror 18 is flat having a reflectivity of approximately 99%. Mirrors 16 and 17 are axially spaced a distance of approximately 8.35 cm and mirrors 17 and 18 are spaced apart by a distance of approximately 78.33 cm and the optical axes of the two arms of the resonator 15 are angularly spaced apart by an angle of approximately 13.6°. The laser gain material 12 comprises a slab of Nd:glass, the neodymium doping being approximately 3% and the thickness of the slab being approximately 3 mm. The diode laser 13 is a Toshiba model F4043 with output wavelength of 802 nm. The pumping radiation is 80% transmissive through the mirror 16 into the laser gain medium 12. The spot size of the pumping radiation as focused onto the laser gain medium 12 was approximate 40 $\mu$m diameter, whereas the confocal resonator waist was approximately 36.5 $\mu$m. The mode-locker 22 modulated the lasant radiation within the optical resonator at a modulation frequency of 86.93 MHz.

In this laser 11, the pump light was absorbed in less than three mm of the gain medium 12 and the diode laser emission spectrum was tailored to overlap with the absorption spectrum of the laser gain medium 12 by temperature tuning the diode laser 13.

The Brewster angle orientation of the gain medium 12 gave low insertion loss. In addition, the Brewster angle gain medium compensated for the astigmatism due to the oblique incidence center mirror at the particular included angle between the two arms of the cavity 15, which in this particular case was 13.6°. Thus, extremely low cavity loss was realized in this geometry. The small spot size coupled with the low cavity loss made it possible to have low threshold and high slope efficiency. The low loss led to low saturated gain which gave shorter pulses according to mode-locktheory. For example, in a cw mode-locked Nd:glass laser 11, a lasing threshold of 14 mW of the absorbed diode laser power was observed with a slope efficiency of 16% producing 10 ps width pulses at 173.871 MHz.

Figure 2:
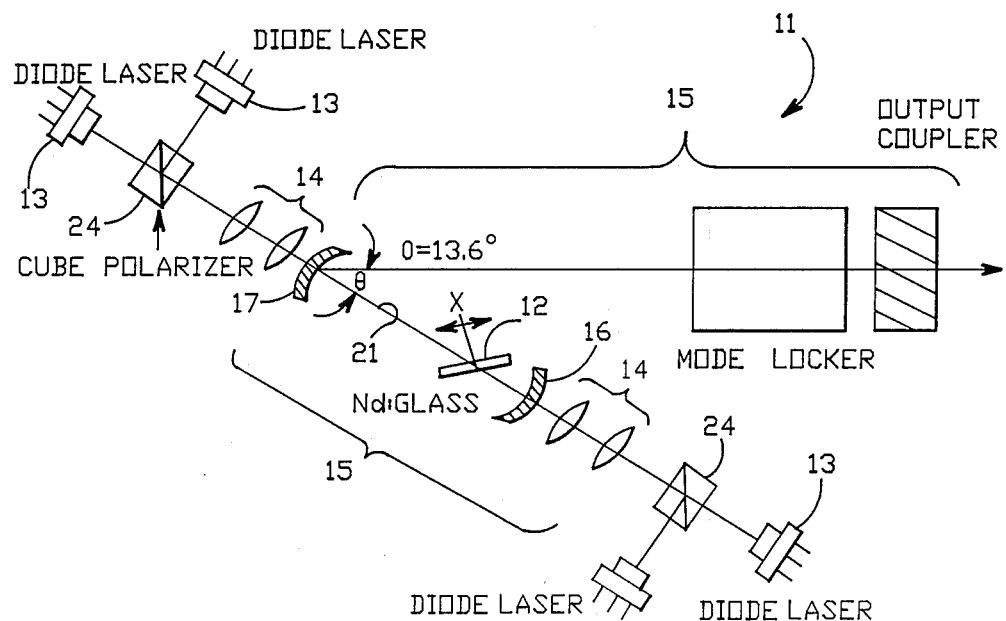
FIG. 2 is a view similar to that of FIG. 1 depicting an alternative embodiment of the present invention.

Referring now to FIG. 2, there is shown an alternative embodiment of the laser 11 of the present invention. In this embodiment, the structure is essentially identical to that of FIG. 1 except that the laser gain medium 12 is optically pumped from both sides through both confocal mirrors 16 and 17 by diode lasers 13 directing their optical pumping radiation into the respective focusing lenses 14 via the intermediary of cube polarizers 24. The embodiment of FIG. 2 provides a scale-up by a factor of 4 in the pump power. For example, with four one-watt diode lasers 13, it is possible to generate over one watt of average output power at 1.05 $\mu$m from a cw mode-locked Nd:glass laser 11.

The advantage of the laser of the present invention includes: the laser gain medium is in the form of a flat disc, requiring no special fabrication or coating. This enables the use of low-cost active medium and makes replacement of the active medium easy. It also allows easy substitution of other active media without extensive resonator adjustments, except for possible changes in the coatings on the mirror surfaces. The short active medium length also limits dispersive pulse broadening. Moreover, the pump beam is collinear with the laser beam and, in this way, the laser beam is unaffected by thermal and stress-induced focusing problems.

Another important advantage of the laser of the present invention is the capability of inserting other intracavity elements to alter the laser operation. For example, an acousto-optic Q-switch may be placed with or without the mode-locker to obtain Q-switched pulses for high peak power. The laser 11 can also be Q-switched easily by modulating the laser diode current or by chopping the resonator beam. An active-passive mode-lock system can be built for generating short and reproducible pulses by placing a passive mode-locking cell next to the active medium 12 where the resonator spot size is small. The long, confocal parameter in the arm of the resonator which includes the gain medium 12, allows positioning of a second harmonic generating crystal, such as $LiNbO_3$, next to the laser gain medium 12 to take advantage of the high power density at the beam waist. In an alternative embodiment, the laser gain medium is replaced with a self-doubling active medium such as Nd doped $MgO:LiNbO_3$.

Another very important advantage of the laser of the present invention is the possibility of scaling-up to very high average power levels. The laser gain medium can be rotated about its x axis and translated parallel to the broad faces simultaneously. Thus, in this manner, the heat dissipation area will be vastly increased, only limited by the disc size. This enables the laser operation to be unaffected by thermal problems associated with a stationary design. The laser of the present invention is superior to other large area side-pumped geometries in that the laser efficiency is maintained at high level from very low average power to arbitrarily high average power operation. Such a high efficiency configuration is suitable in a free-running, Q-switched, mode-locked, pulsed and in any combination of these modes of operation.

Uses for a cw mode-locked laser source at 1 $\mu$m are many. Such a laser is useful for injection seeding into a high-gain, high-power oscillator to extract all the energy in short pulses at high efficiency. Such a laser is also suitable as a master oscillator for large Nd:glass amplifier chains used commonly in laser fusion. The short pulses form the mode-locked laser are further compressible in fiber-grating compressors to make all solid-state femtosecond light sources. This short pulse source is useful in electro-optic and electrical sampling of semiconductor circuits. The high peak power cw laser source is ideal for frequency conversion and other non-linear optical devices.

What is claimed is:

1. In a method for obtaining lasant radiation from a semiconductive diode pumped member of solid state laser gain material, the steps of:
focusing optical pumping radiation emanating from a semiconductive diode source onto a solid state member of laser gain material for optically pumping a mode volume region thereof to excite optical lasant radiation from said laser gain material;
resonating the optical lasant radiation emanating from said laser gain material between reflectors defining an optical resonator having an optical axis passing through the optically pumped region of said laser gain member;
focusing the resonant lasant radiation between two concave reflectors of said optical resonator to form a beam waist within said optically pumped mode volume of said laser gain member; and
modelocking said resonant lasant radiation within said optical resonator.

2. The method of claim 1 wherein said step of modelocking includes the step of:
modulating the resonated lasant radiation within said optical resonator.

3. The method of claim 1 wherein said member of laser gain material is a slab having a pair of relatively narrowly spaced apart mutually opposed broad major faces and including the step of:
orienting said slab of laser gain material within said optical resonator with said major faces generally at Brewsters angle relative to the confocally focused resonated lasant radiation, whereby the insertion loss of said laser gain medium is reduced.

4. The method of claim 3 including the step of moving the slab within said optical resonator for averaging heating effects within said slab of laser gain material.

5. The method of claim 1 wherein said optical resonator is a three reflector one and a third one of said reflectors defining said optical resonator with said two concave reflectors is essentially planar, including the steps of:
disposing and orienting said planar reflector to reflect resonated lasant radiation incident thereof back to one of said concave reflectors of said optical resonator; and
wherein the step of modelocking is performed on the lasant radiation between said planar reflector and one of said concave reflectors.

6. The method of claim 1 including the step of:
directing and focusing optical pumping radiation from a second semiconductive diode into said optically pumped mode volume of said laser gain member.

7. The method of claim 1 including the step of:
disposing an optically non-linear harmonic generating medium essentially at said beam waist on the optical axis of said optical resonator between said two concave reflectors for generating harmonic radiation of said lasant radiation.

8. The method of claim 7 wherein said optically pumped mode volume of said laser gain member is an optically non-linear material for harmonic generation.

9. The method of claim 8 wherein said non-linear laser gain material is Nd doped $MgO:LiNbO_3$.

10. The method of claim 3 wherein the slab of laser gain material is of a material selected from the group consisting of Nd:glass, Nd:YAG, Nd doped MgO:LiNbO3, and Nd:NLF.

11. In a laser for obtaining lasant radiation from a semiconductive diode pumped member of solid state laser gain material:
focusing means for focusing optical pumping radiation emanating from a semiconductive diode source onto a solid state member of laser gain material for optically pumping a mode volume region thereof to excite optical lasant radiation from said laser gain material;
optical resonator means for resonating the optical lasant radiation emanating from the optically pumped region of said laser gain material along an optical axis passing through the optically pumped region of said laser gain member;
focusing means for focusing the resonated lasant radiation between two concave reflectors of said optical resonator to form a beam waist within said optically pumped mode volume of said laser gain member; and
means for modelocking said resonated lasant radiation within said optical resonator essentially collinearly of the optical axis of said focused lasant radiation within said optically pumped mode volume of said laser gain member.

12. The laser of claim 11 wherein said modelocking means includes:
modulating means for modulating the resonated lasant radiation within said optical resonator means.

13. The laser of claim 11 wherein said member of laser gain material is a slab having a pair of relatively narrowly spaced apart mutually opposed broad major faces and.
said slab is oriented within said optical resonator means with said major faces essentially at Brewsters angle relative to the focused resonated lasant radiation, whereby the insertion loss of said laser gain medium is reduced.

14. The laser of claim 13 including:
means for moving said slab of laser gain material within said optical resonator means for averaging heating effects within said slab of laser gain material.

15. The laser of claim 12 wherein said resonator is a three-mirror one and a third one of said reflectors defining said optical resonator with two concave reflectors is generally planar, said third planar reflector positioned to reflect generally collimated resonated lasant radiation incident thereon back to one of said concave reflectors of said optical resonator; and
wherein said modulating means is disposed within said resonator means proximate said planar reflector for modulating the collimated lasant radiation between said planar reflector and one of said concave reflectors to improve the efficiency of the modulation.

16. The laser of claim 11 including:
means for directing and focusing optical pumping radiation from a second semiconductive diode into said optically pumped mode volume of said laser gain member.

17. The laser of claim 11 including:
an optically non-linear harmonic generating medium disposed essentially at said beam waist on the optical axis of said optical resonator means between said two concave reflectors for generating harmonic radiation of said lasant radiation.

18. The laser of claim 17 wherein said laser gain member is an optically non-linear material for harmonic generation.

19. The laser of claim 18 wherein said non-linear laser gain material is Nd doped $MgO:LiNbO_3$.

20. The laser of claim 13 wherein said slab of laser gain material is of a material selected from the group consisting of Nd:glass, Nd:YAG, Nd doped $MgO:LiNbO_3$, and Nd:NLF.

21. In a solid state laser:
an optical resonator defined by a pair of essentially coaxial concave reflectors and a essentially planar reflector disposed off the axis of said concave reflectors;
a member of laser gain material disposed on the optical axis of said resonator between said concave reflectors;
a semiconductive diode junction source of optical pumping radiation disposed outside of said optical resonator; and
an optical focusing lens structure disposed outside of said optical resonator for focusing optical pumping radiation emanating from said diode through one of said concave reflectors essentially coaxially of and along said optical axis and into said member of laser gain material for optically pumping a mode volume region of said member to excite lasant optical transitions of said optically pumped region of said laser gain member for emission of optical lasant radiation and excitation of an optically resonant mode of said optical resonator 22. The laser of claim 21 wherein said optically pumped laser gain member comprises a slab having a pair of narrowly spaced apart major planar faces disposed essentially at Brewsters angle relative to said optical axis.

23. The laser of claim 22 wherein said concave reflectors focus said lasant radiation to a beam waist on the optical axis of said optical resonator and wherein said optically pumped mode volume region of said laser gain member is disposed essentially at said beam waist.

24. The laser of claim 21 including:
an acousto-optic modulator disposed on the optical axis of said optical resonator between said planar reflector and one of said concave reflectors and responsive to a modulation signal for mode-locking the resonant lasant radiation within said optical resonator.

* * * * *